United States Patent Office 3,469,945
Patented Sept. 30, 1969

3,469,945
METHOD AND APPARATUS OF MEASURING THE SPEED OF THERMAL DECOMPOSITION OF POLYMERS
Marcel Delassus, Mazingarbe, Richard Devaux, Vermelles, and Theophile Hofman, Grenay, France, assignors to Houilieres du Bassin du Nord & du Pas-de-Calais Douai (Nord), France, a French public establishment
Filed July 13, 1966, Ser. No. 564,991
Claims priority, application France, July 26, 1965, 26,065
Int. Cl. G01n 33/44, 31/00
U.S. Cl. 23—230       9 Claims

ABSTRACT OF THE DISCLOSURE

A method and apparatus which permit the rate of thermal decomposition of polymers to be easily determined at any given temperature. A sample of the polymer is heated in a thermolysis chamber and the products are scavenged by an inert gas passing through the chamber at a constant flow rate, the effluent being oxidized to convert the products to carbon dioxide and water vapor. The water vapor is eliminated and the carbon dioxide concentration is measured at regular intervals to determine the rate of thermal decomposition of the polymer.

---

Figure 1:
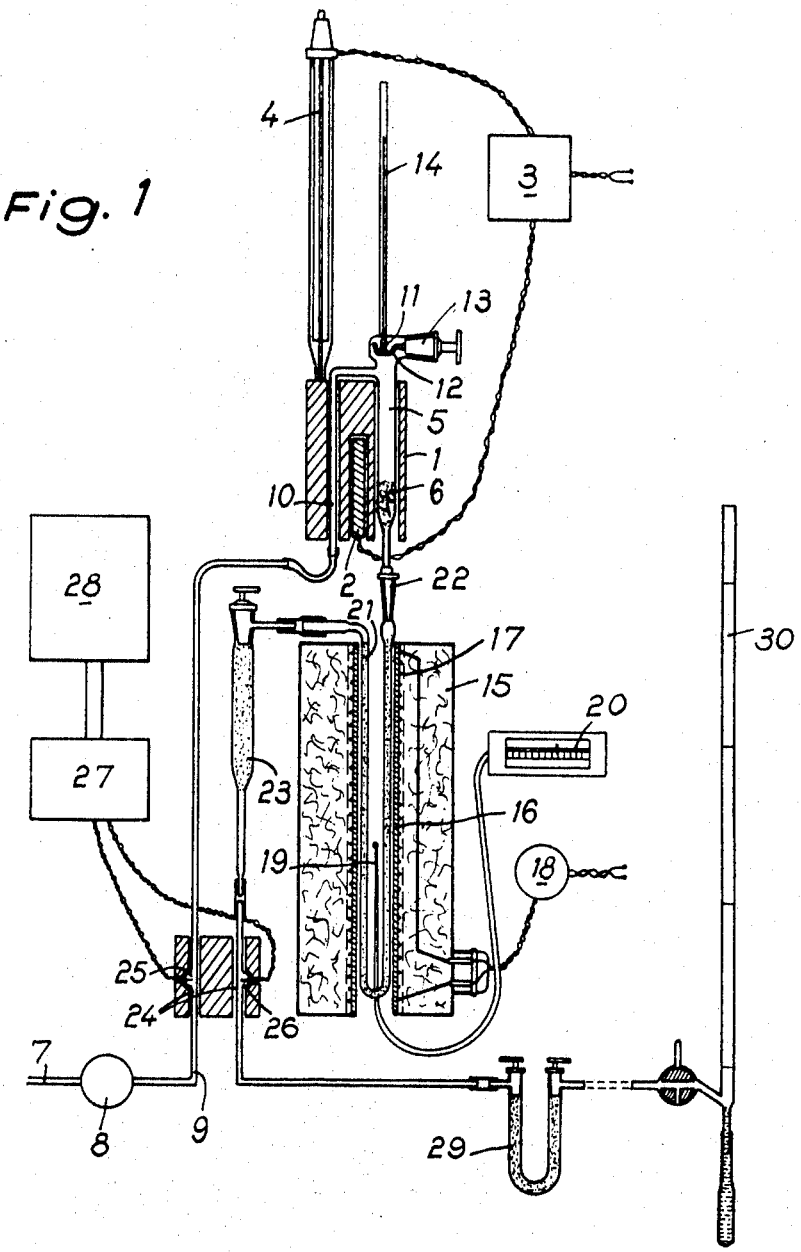

The present invention relates to a method of measuring the speed of thermal decomposition of polymers and to apparatus for carrying out the method.

It is well-known that under the action of heat polymers progressively depolymerize at a speed which depends on the nature of the polymer, the temperature to which the polymer is heated, the nature of the atmosphere surrounding the polymer and the partial pressure of the decomposition gases. Since the speed of depolymerization depends upon the number and on the nature of the chains present in the sample concerned, measurement of the speed of depolymerization is used to study the structure of polymers; it is also very important when it is desired to know the behaviour of these polymers during moulding.

The conventional methods of determining the speed are to heat the polymer to a given temperature and measure against time either the pressure variation of the decomposition gases at constant volume or their volume variation at constant pressure or the loss of weight of the sample, which is determined manually or automatically by means of a thermobalance. The result is a curve, the tangent to which defines the speed of depolymerization at any given time.

These methods have a number of disadvantages:

(i) In the case of the first two (measurement of pressure variation or volume variation), the polymer remains in the presence of the decomposition gases. Even if the sample is isolated from these gases by a layer of oil which is inert with respect to the polymer, their total elimination is difficult and the kinetics of the thermolysis is effected as a result.

(ii) In the third method (measurement of the loss of weight of the sample), the weight of the sample has to be of the order of 0.1 to 1 g. depending upon the sensitivity of the thermobalance available and since thermal decomposition of polymers is generally an endothermic phenomenon it can progress only if the heat transfer to the sample occurs quickly enough so as not to limit the speed of decomposition. Since polymers are poor conductors of heat, this factor introduces a certain unreliability.

(iii) Also, since the partial pressure of the decomposition gases around the sample influences the speed of thermolysis, this pressure must be reduced by diluting the gases in an inert gas until it can be disregarded, and this means that the sample has to be swept by a fairly fast stream of gas. This condition is difficult to satisfy in a thermobalance in which a relatively large sample is suspended in a stream of gas which sweeps the walls of the container; the transfer of material is therefore likely to be affected by the coefficient of diffusion of the gases.

(iv) One of the main characteristics of polymers is the initial thermal decomposition speed constant. If the order of the reaction is not known, this speed constant can be determined with enough accuracy only if the sample is very rapidly heated to the test temperature. This condition is also very difficult to satisfy with the previous methods.

(v) Finally, determination of the tangent to the curve obtained with these methods is inaccurate and the speed of decomposition cannot be measured with accuracy.

We have now devised a method of determining the speed of thermal decomposition of polymers which is accurate easy in use and which enables the speed of thermal decomposition to be measured at any given temperature.

The method according to the invention comprises heating a polymer sample to a thermolysis temperature in a thermolysis chamber lined with a heat conducting material; entraining the thermolysis products forming in the chamber by a current of an inert scavenging gas passing through the chamber at a constant rate of flow; oxidising the thermolysis chamber effluent in an oxidation chamber to convert the thermolysis products to carbon dioxide and water vapour; eliminating the water vapour from the oxidation chamber effluent by absorption; and measuring the carbon dioxide concentration in the oxidation chamber effluent at regular intervals, such concentration being a direct measurement of the speed of thermal decomposition of the polymer.

A very small sample of polymer may be used, of the order of 0.010 to 0.1 g., preferably in the form of a small, compressed pellet.

The scavenging gas used should be an inert gas having a thermal conductivity substantially different from that of carbon dioxide, e.g. helium.

The oxidation will generally be carried out over a catalyst such as activated or pure copper oxide, for example.

The water vapour absorbent will, for example, be phosphoric anhydride deposited on pumice stone.

The carbon dioxide concentration can be measured by known methods, e.g. measurement of thermal conductivity, flame ionisation, infra-red absorption, or mass spectrometry.

Figure 2:
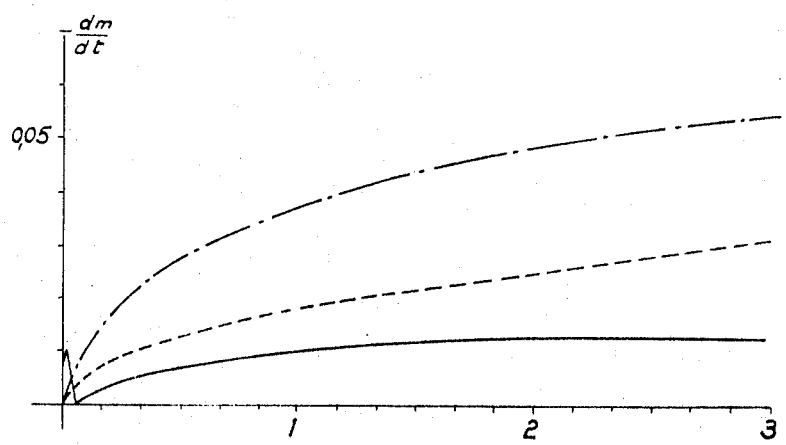
Figure 3:
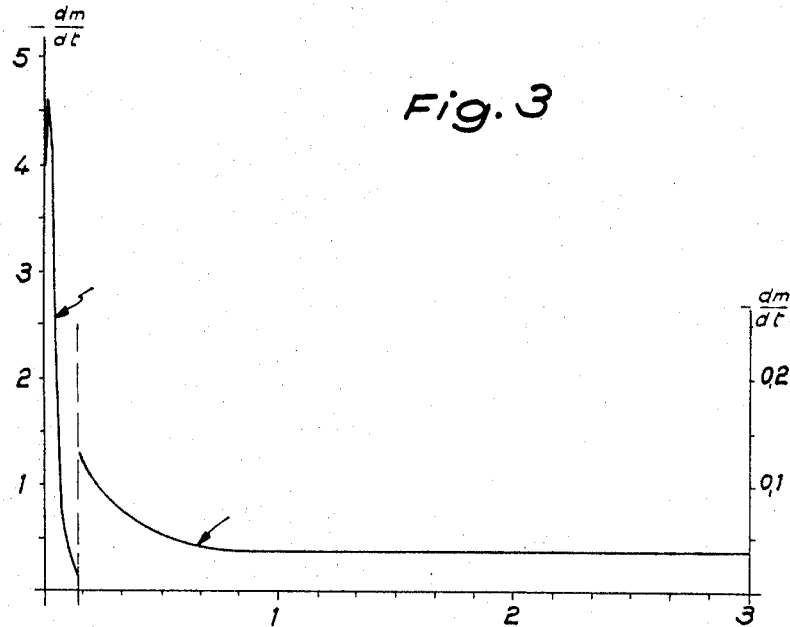

In the drawings:
FIG. 1 is a schematic diagram showing an apparatus made in accordance with the present invention;
FIG. 2 is a graph showing curves of the rate of thermal decomposition of acetylated polyoxymethylene at 222° C. and at 250° C. and of polyethylene at 250° C.; and
FIG. 3 is a graph showing the curve of the rate of thermal decomposition of unstabilized polyoxymethylene at 222° C.

In order that the invention may be more fully understood a preferred apparatus for measuring the thermal decomposition of polymers will now be described by way of example only with reference to FIGURE 1 of the accompanying drawings which illustrates the apparatus.

This apparatus comprises essentially:
(i) a thermolysis device,
(ii) an oxidation device for the themolysis products,
(iii) a dehydration device for the oxidised thermolysis products,
(iv) a device for measuring the thermal conductivity of the oxidised and dehydrated thermolysis products,
(v) a calibration device, and (vi) a device for measuring the rate of flow of gas.

The thermolysis device comprises:

(a) an oven 1 made of a metal which is a good conductor of heat, e.g. aluminium, heated by a heater plug 2, (b) a system 3 for controlling the temperature of the oven 1; this system will, for example, comprise an auto-transformer feeding the heater plug 2, a resistor in series with the auto-transformer, and a contact thermometer 4 which switches the resistor in or out through the agency of a relay to allow fine adjustment of the temperature, (c) a thermolysis chamber 5 containing glass balls 6, for example of a diameter of 3 mm.

The scavenging gas is supplied via tube 7, expanded through an expansion valve 8. The gas is hot when it enters the top of the thermolysis chamber 5 via the tubes 9, 10 and it thus preheats the sample 11 which is disposed in a glass cup 12 secured to the end of a conical ground joint 13. Rotation of the conical ground joint through 180° enables the sample to be dropped onto the glass balls in the thermolysis chamber.

A thermometer 14 is also disposed at the top of the thermolysis chamber 5.

The thermolysis product oxidation device comprises:

(a) an oven 15 consisting of a refractory tube 16 around which a heater resistor 17 is wound. The temperature of this oven is held at 450° C. by a bimetallic contractor 18.

(b) a thermocouple 19 and a millivoltmeter 20 to measure the temperature of oven 15.

(c) a quartz U-tube 21 containing activated copper oxide in the form of granules of a diameter of from 1 to 2.5 mm.

This tube is connected to the thermolysis chamber 5 by a conical ground joint 22.

At the exit from the oxidation oven 15, the oxidised thermolysis product dehydration device comprises an absorber tube 23 filled with $P_2O_5$-coated pumice stone particles to eliminate the water vapour forming during oxidation.

The device for measuring the thermal conductivity of the gases consists of:

(a) a cell 24 comprising two thermistors to measure the thermal conductivity of the gases; the scavenging gas passes through one of the compartments 25 and the $CO_2$-laden effluent passes through the other 26;

(b) a conventional Wheatstone bridge 27 fed by a cell and the arms of which contain the two thermistors;

This bridge includes a voltage divider so that the sensitivity of measurement can be adjusted.

(c) a recording potentiometer 28 which directly plots the curve of the speed of thermal decomposition (to within a coefficient which is determined by calibration).

The calibration device comprises a tube 29 filled with Ascarite to absorb the carbon dioxide; the amount of $CO_2$ forming during a given period $t$ can be determined by weighing the tube 29. Integration of the thermal decomposition curve corresponding to the same period will enable the curve to be calibrated for speed of decomposition.

Finally, the gas flow measuring device comprises a flowmeter 30 containing soap bubbles.

In operation, the polymer sample 11 previously heated by the scavenging gas to a temperature at which there is zero decomposition fed via conduits 7, 9, 10 is pivoted into the thermolysis chamber 5 and on to the glass balls 6, which are heated to a constant thermolysis temperature, and in contact with these the sample melts instantaneously and spreads out over their surface. Since the mass of the sample (0.01 to 0.1 g.) is practically negligible with respect to that of the balls, there is no heat transfer delay and thermolysis begins at once. Also, since the scavenging gas is in intimate contact with the sample, the decomposition gases or thermolysis products are removed as quickly as they form and their partial pressure around the sample is reduced to a minimum.

Since the decomposition gases are diluted in the scavenging gas, their concentration in the effluent must be known exactly at all times, such concentrations being a direct measurement of the speed of thermolysis. To this end, the thermal conductivity of the outgoing gas is measured.

Since secondary reactions may occur during thermolysis, the effluent might contain constituents other than the monomer itself, and such constituents may have a different thermal conductivity, which might give incorrect measurements.

To obviate this disadvantage, the gases leaving the thermolysis chamber 5 flow through the tube 21 containing the activated or pure copper oxide which converts all the thermolysis products to carbon dioxide and water vapour, and then the absorber tube 23 which is lined with a dehydrating agent which does not absorb carbon dioxide e.g. phosphoric anhydride deposited on pumice stone, the dehydrating agent retaining the water so that the gas mixture then contains only two constituents, i.e. carbon dioxide and the scavenging gas.

If the inert scavenging gas used is one whose thermal conductivity is very much different from that of carbon dioxide, e.g. helium, very low carbon dioxide concentrations can be accurately determined by measuring the thermal conductivity and be directly recorded by a conventional device such as recording potentiometer 28.

If the measuring cell used for the thermal conductivity is a thermistor cell 25, the thermistors having appropriate characteristics, the sensitivity adapted to each type of polymer can be obtained, such sensitivity being adjusted by a voltage divider inserted in the Wheatstone bridge 27, the arms of which contain the thermistors, and may be adjusted during measurement as required.

Since the rate of flow of scavenging gas is kept constant, the carbon dioxide concentration in the effluent gives a direct and instantaneous measurement of the rate of decomposition of the polymer.

The present invention enables all homopolymers containing no elements other than carbon, hydrogen and oxygen, to be studied, e.g. polydienes, polystyrenes, polyvinyl acetates, polyvinyl alcohols, polyvinyl acetals, polyacrylates and polymethylacrylates, phenoplasts, polyesters, acetals, and more particularly, polyoxymethylenes.

If some precautions are taken, it is also possible to study homopolymers containing elements other than carbon, hydrogen and oxygen, and also copolymers.

As examples of application, the accompanying drawing shows the curves of the rate of thermal decomposition at various temperatures for the following products:

Unstabilised polyoxymethylene—at 222° C. (FIGURE 3).
Acetylated polyoxymethylene—at 222° C. (FIGURE 2).
Acetylated polyoxymethylene—at 250° C. (FIGURE 2).
Polyethylene—at 250° C. (FIGURE 2).

These products were examined under the following conditions:

Amount of sample: 50 mg. (in pastille form).
Scavenging gas: helium (6 litres per hour).

In the case of unstabilised polyoxymethylene, the initial decomposition speed at 222° C. was 4.61% per minute.

For the other products the rate of decomposition increases with time. The decomposition curve for polyethylene at 250° C. has a peak at the beginning of thermolysis and this might correspond to the presence of an impurity which is difficult to detect by any other method.

What is claimed is:

1. The method of continuously measuring the speed of thermal decomposition of a sample of a synthetic polymeric material comprising at least carbon and hydrogen atoms, which method comprises the steps of:

(i) heating said sample to a thermolysis temperature in a thermolysis chamber, (ii) entraining the thermolysis products derived from said sample with an inert scavenging gas flowing through said thermolysis chamber at a constant flow rate, (iii) oxidising said thermolysis products in the effluent from the thermolysis chamber in an oxidation chamber, said effluent consisting essentially of said inert scavenging gas and said thermolysis products, to form carbon dioxide and water, (iv) eliminating water vapour from the effluent from the oxidation chamber by passage over a water absorbent, (v) measuring the carbon dioxide concentration in the effluent from the oxidation chamber, after the elimination of the water therefrom, (vi) calculating the speed of thermal decomposition of said synthetic polymeric material from the carbon dioxide concentration.

2. The method of claim 1 wherein said synthetic polymeric material is a homopolymer comprising only carbon and hydrogen atoms.

3. The method of claim 1 wherein said synthetic polymeric material is a homopolymer comprising only carbon, hydrogen and oxygen atoms.

4. The method of claim 1 wherein said carbon dioxide concentration in said effluent from said oxidation chamber after the elimination of water therefrom is measured by measuring the thermal conductivity of said effluent.

5. Apparatus for continuously measuring the speed of thermal decomposition of a synthetic polymeric material comprising at least carbon and hydrogen atoms, which apparatus comprises, in combination:

(i) a thermolysis chamber for retaining said material and means associated with said chamber for heating said chamber to a constant thermolysis temperature, (ii) an oxidation chamber operatively connected for gas flow to said thermolysis chamber, (iii) water absorption means operatively connected for gas flow to said oxidation chamber, (iv) carbon dioxide gas concentration measurement means operatively connected for gas flow to said water absorption means, (v) means for supplying a stream of an inert, scavenging gas at a constant flow rate successively through said thermolysis chamber, said oxidation chamber, said water absorption means and said carbon dioxide concentration means.

6. The apparatus of claim 5 wherein said thermolysis chamber contains particulate filling material and includes means for bringing said polymeric material onto said particulate filling material.

7. The apparatus of claim 6 wherein said carbon dioxide gas concentration measurement means comprises means for measuring the thermal conductivity of the gas flowing through said measurement means.

8. The apparatus of claim 6 wherein means are provided for heating said inert, scavenging gas prior to its admission to said thermolysis chamber.

9. The apparatus of claim 6 wherein means are provided for heating said oxidation chamber.

References Cited
UNITED STATES PATENTS

| | | |
|---|---|---|
| 3,096,157 | 7/1963 | Brown et al. _____23—232 |
| 3,168,378 | 2/1965 | Maresh et al. |
| 3,252,759 | 5/1966 | Simon. |

MORRIS O. WOLK, Primary Examiner

R. E. SERWIN, Assistant Examiner

U.S. Cl. X.R.

23—253